No. 764,220. PATENTED JULY 5, 1904.
L. E. WATERMAN.
SEEDING MACHINE.
APPLICATION FILED JAN. 22, 1903.
NO MODEL.

Witnesses:
J. S. Clark
Wm. E. Griggs

Inventor:
Lewis E. Waterman
By A. T. Bekel
Atty

No. 764,220. Patented July 5, 1904.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

SEEDING-MACHINE.

SPECIFICATION forming part of Letters Patent No. 764,220, dated July 5, 1904.

Application filed January 22, 1903. Serial No. 140,185. (No model.)

*To all whom it may concern:*

Be it known that I, LEWIS E. WATERMAN, a citizen of the United States, residing at Rockford, in the county of Winnebago and State of Illinois, have invented certain new and useful Improvements in Seeding-Machines, of which the following is a specification.

The object of this invention is to construct a seeding-machine in which the main frame is supported upon carrying-wheels and the seedbox and shovels are supported by a supplementary frame pivoted to the main frame.

Figure 1:
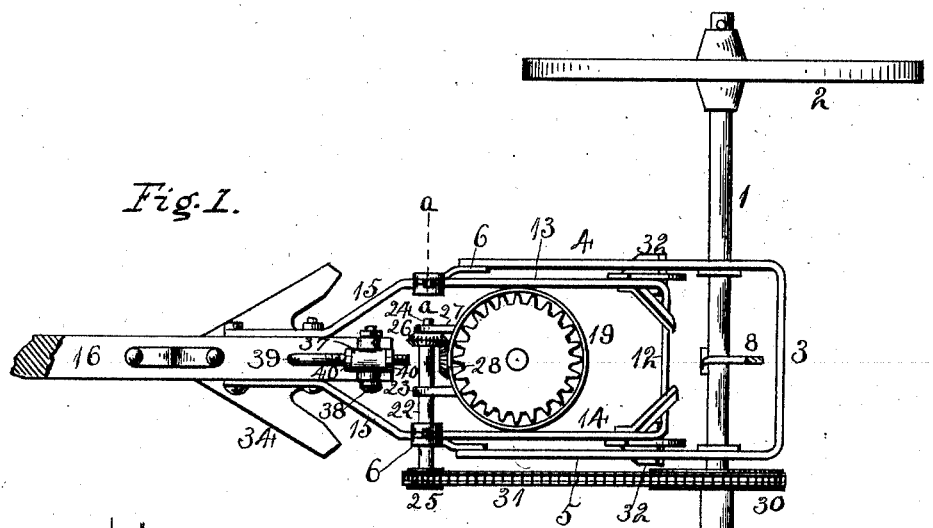
Figure 3:
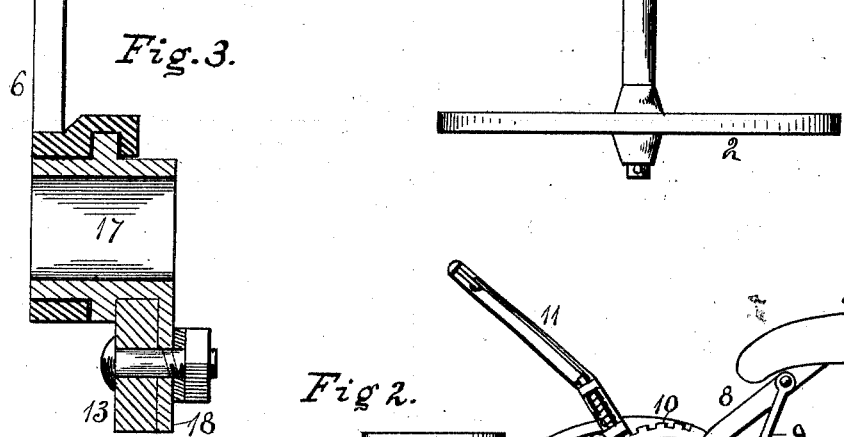
Figure 2:
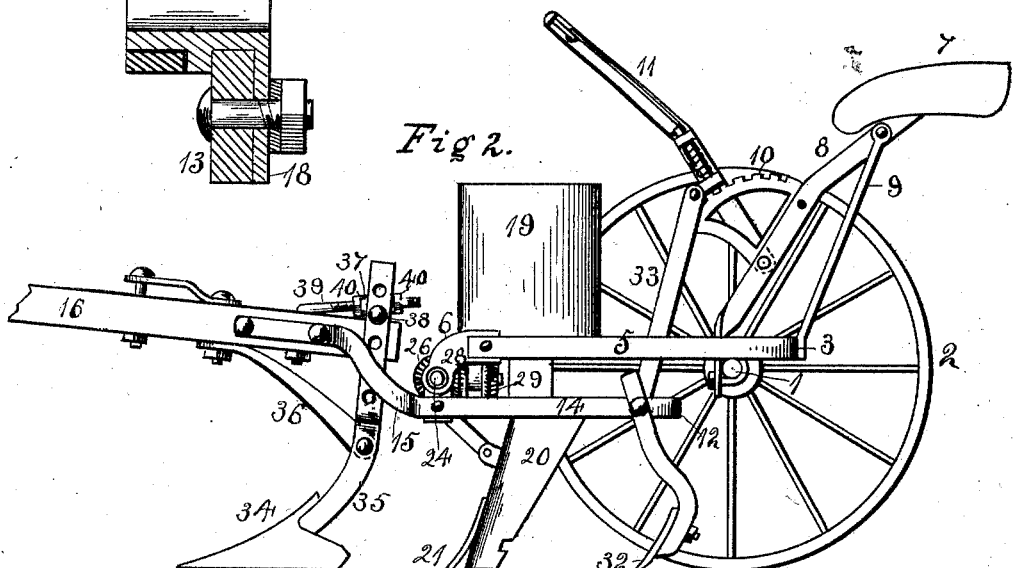

In the accompanying drawings, Figure 1 is a plan view of my improved seeding-machine. Fig. 2 is a side elevation. Fig. 3 is a section on dotted line $a$, Fig. 1.

The axle 1 is supported by carrying-wheels 2. To the axle is connected a frame composed of the end bar 3 and side bars 4 and 5. The forward ends of the side bars 4 and 5 support brackets 6, having circular openings.

A seat 7 is supported by a bar 8, connected to the axle, and a brace-bar 9, connected to the end bar of the main frame. A toothed segment 10 is supported by the bar 8. A hand-lever 11 has a pivotal connection with the bar 8 and has a dog engaging the teeth of the toothed segment.

A supplementary frame is composed of the end bar 12, side bars 13 and 14, and forward extensions 15, connected to the tongue 16. This supplementary frame has a pivotal connection with the main frame by means of brackets having a tubular portion 17 entering the circular opening of the brackets 6, and to the lower end 18 of these brackets the side bars of the supplementary frame are connected.

A seedbox 19 is supported by the side bars 13 and 14 of the supplementary frame, also a tube 20, having the furrow-opener 21.

A sleeve 22 is supported by the bracket connecting the end bar 14 of the supplementary frame and side bar 5 of the main frame and is also supported by the seedbox by the arm 23. A shaft 24 is located in the sleeve and supports a sprocket-wheel 25 on one end and a beveled toothed wheel 26 near its other end. An arm 27, extending from the seedbox, supports the inner end of the shaft.

The seed-dropping mechanism of the seedbox is operated by the beveled toothed wheels 28 and 29, the former engaging the teeth of the beveled toothed wheel 26. A sprocket-wheel 30 is supported by the axle, and a chain 31 connects it with the sprocket-wheel 25.

Shovels 32 are supported by the supplementary frame. Links 33 form a connection between the supplementary frame and the hand-lever 11.

A sweep 34 is located near the rear end of the tongue and is supported by its standard 35, having a pivotal connection with the tongue through the arm 36. The upper ends of the standard extend on either side of the tongue and are connected above the tongue by a cross 37, having a bolt 38 extending through the cross and arms of the standard. A rod 39 has one end connected to the tongue and its other end screw-threaded and passing through the other branch of the cross and has nuts 40 on either side of the cross. By means of the cross and the nuts 40 on the rod 39 the upper ends of the standard can be moved so as to rock the sweep to allow it to take more or less land, and the nuts hold it when adjusted.

By locating the shaft 24 on the pivotal center forming the connection between the main and supplementary frames the slack in the chain 31, connecting the sprocket-wheels 25 and 30, will remain the same.

By locating the supplementary frame between the side bars of the main frame the seedbox and covering-shovels can be located in rear of the pivotal connection between the frames, thereby shortening the frame of the machine and more nearly counterbalance the weight of the supplementary frame and the parts supported by it.

By means of the hand-lever the supplementary frame can be raised and lowered and held at the proper working depth.

I claim as my invention—

1. In a seeding-machine, the combination of a main frame supported on carrying-wheels, a supplementary frame pivoted to the main frame and extending within the main frame rearward of such pivotal connection, a seedbox, furrow-opener and covering-shovels supported by the supplementary frame and located in rear of the pivotal connection between the frames, and a sweep supported by the supplementary frame in advance of such pivotal connection.

2. In a seeding-machine, the combination of a main frame, and a supplementary frame having a pivotal connection, a seedbox, and mechanism for operating the seed-dropping device driven by a shaft located concentric with the pivotal connection between the frame, the supplementary frame located within the main frame.

3. In a seeding-machine, a sweep supported by the machine, and having a pivotal connection therewith, the standard of the sweep formed of two branches connected by a cross, a rod connected to the cross and the machine and nuts on the rod on either side of the cross in order that the sweep may be rocked on its pivotal support.

4. In a seeding-machine, the combination of a main frame supported on carrying-wheels, a supplementary frame having a pivotal connection with said main frame, and a sweep connected with the supplementary frame in advance of said pivotal connection, substantially as described.

5. In a seeding-machine, the combination with carrying-wheels and a main frame supported thereon, of a standard supported by said machine and having a pivotal connection therewith, a bar on said standard, a rod connected with said bar and with the machine, nuts on said rod upon either side of said bar, whereby said standard may be rocked on its pivotal support, a sweep carried on said standard, a supplementary frame pivotally connected with said main frame and extending rearward from said pivotal connection within said main frame, a seedbox, and furrow-openers and covering-shovels supported by said supplementary frame, substantially as described.

6. In a seeding-machine, the combination with carrying-wheels and a main frame supported thereon, of a standard supported by said machine and having a pivotal connection therewith, and bifurcated at its upper end, a cross-bar connecting said bifurcations, a rod mounted on said machine and engaging said cross-bar, nuts on said rod bearing upon each side of said cross-bar, whereby said standard may be rocked on its pivotal support and held in adjustment thereon, a supplementary frame pivotally connected with said main frame and extended rearward within said main frame, and a seedbox and shovels supported by said supplementary frame, substantially as described.

7. In a seeding-machine, an axle, supporting-wheels, a main frame supported by the axle and extending forward thereof, a supplementary frame having a pivotal connection with the forward portion of the main frame, a seedbox, furrow-opener and covering devices located in rear of the pivotal connection and movable with the supplementary frame, a lifting-lever arrangement for moving the supplementary frame and a sweep supported in advance of the pivotal connection between the frames.

8. In a seeding-machine, an axle, supporting-wheels, a main frame supported by the axle and extending forward thereof, a supplementary frame having a pivotal connection with the forward portion of the main frame and having a portion extending rearward of the pivotal connection and a portion extending forward of the pivotal connection, a seedbox, furrow-opener and covering devices movable with the rearward portion of the supplementary frame, and a lifting-lever arranged for moving the supplementary frame.

9. In a seeding-machine, the combination of a main frame and a supplementary frame pivotally connected therewith, the supplementary frame extending rearward within the main frame and capable of being adjusted vertically relatively thereto without contacting therewith, and a furrow-opener, seedbox and covering device having a connection with the supplementary frame.

10. In a seeding-machine, the combination of a main frame and a supplementary frame pivotally connected therewith, the supplementary frame extending rearward of the main frame and terminating at a point forward of the rear cross-bar of the main frame, whereby said supplementary frame may be adjusted vertically within the main frame, and a furrow-opener, seedbox and covering devices supported by the supplementary frame.

11. In a seeding-machine, the combination of an axle and supporting-wheels, a main frame, a supplementary frame having a pivotal connection with the main frame, a lifting-lever having a connection with the rear portion of said supplementary frame, whereby the same may be moved relatively to the axle, a tongue secured to the forward portion of said supplementary frame, a sweep supported from the tongue, a furrow-opener, seedbox and covering devices movable with said supplementary frame and located in line with the sweep.

12. In a seeding-machine, the combination of an axle and supporting-wheels, a main frame, an open supplementary frame having a pivotal connection with the main frame forward of the axle, a tongue secured to said supplementary frame forward of the said pivotal connection, a seedbox, furrow-opener and covering devices movable with said supplementary frame, and a sweep supported in advance of the furrow-opener.

13. In a seeding-machine, the combination of a main frame and a supplementary frame pivotally connected therewith, the supplementary frame being of substantially U shape and extending both forward and rearward of said pivotal connection, a tongue secured between the open front end of said U-shaped frame forward of the pivotal connection, a seedbox, furrow-opener and covering devices movable with the supplementary frame, and a sweep supported by the tongue.

14. In a seeding-machine, the combination of a main frame supported on carrying-wheels, a supplementary frame pivoted to the main frame and extending rearward from said pivotal connection, a tongue secured to said supplementary frame forward of the pivotal connection, and a furrow-opener, seedbox and covering devices supported from said supplementary frame.

15. In a seeding-machine, the combination of a main frame supported on carrying-wheels, a supplementary frame pivoted to the main frame and having portions thereof extending forward and rearward of said pivotal connection, a furrow-opener, seedbox and covering devices supported from the rearwardly-extending portion of the said supplementary frame and a tongue secured to the said forwardly-extending portion.

16. In a seeding-machine, the combination of a main frame supported on carrying-wheels, a supplementary frame pivoted to the main frame and extending rearward from said pivotal point, a tongue secured to said supplementary frame forward of the pivotal connection, a furrow-opener, a seedbox and covering devices having a connection with said supplementary frame, and a lever having a link connection with the rear portion of the supplementary frame, said link connection being forward of the axle.

17. In a seeding-machine, the combination with a main frame, an axle on which said frame is mounted, the mounting being forward of the rear end of the frame, a seat-support secured to the rear end of the frame, a supplementary frame pivoted to the forward portion of the main frame and extending forward and rearward of said pivotal point, a tongue secured to the forward extension of said supplementary frame and a furrow-opener, seedbox and covering devices supported by the rearward extension of said supplementary frame.

18. In a seeding-machine, a main frame supported on carrying-wheels, a seedbox, furrow-opener and covering device located within the boundary of the main frame and capable of vertical adjustment therewithin, and a sweep located in advance of and in line with the furrow-opener.

19. In a seeding-machine, the combination of a main frame, a supplementary frame having a connection therewith, the supplementary frame extending rearward within the main frame and capable of being adjusted vertically therein, a furrow-opener, seedbox and covering device having a connection with the supplementary frame, and a sweep located in advance of and in line with the furrow-opener.

LEWIS E. WATERMAN.

Witnesses:
   A. O. BEHEL,
   E. BEHEL.